US012769848B2

(12) United States Patent
Paterson et al.

(10) Patent No.: US 12,769,848 B2
(45) Date of Patent: Oct. 20, 2026

(54) CLOUD WORKLOAD MANAGEMENT BASED ON CONFIGURABLE COMPLIANCE OBJECTIVES

(71) Applicant: International Business Machines Corporation, Armonk, NY (US)

(72) Inventors: Brady Paterson, Irvine, CA (US); Christopher Paris, Moraga, CA (US); James Donald Thorne, Porters Lake (CA); Shourav De, Navi Mumbai (IN)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 18/931,232

(22) Filed: Oct. 30, 2024

(65) Prior Publication Data

US 2026/0119674 A1 Apr. 30, 2026

(51) Int. Cl.
*G06F 21/57* (2013.01)
*G06F 8/00* (2018.01)
(Continued)

(52) U.S. Cl.
CPC .............. *G06F 21/577* (2013.01); *G06F 8/00* (2013.01); *G06F 21/54* (2013.01); *G06F 21/57* (2013.01); *G06F 8/65* (2013.01); *H04N 21/26291* (2013.01)

(58) Field of Classification Search
CPC ........ G06F 21/577; G06F 21/54; G06F 21/57; G06F 8/00; G06F 8/65; H04N 21/26291
See application file for complete search history.

(56) References Cited

U.S. PATENT DOCUMENTS 8,495,747 B1 * 7/2013 Nakawatase ............ H04L 63/20 726/25
8,769,412 B2 7/2014 Gill et al.
(Continued)

FOREIGN PATENT DOCUMENTS

CN 114168972 A * 3/2022 ............... G06F 8/71

OTHER PUBLICATIONS

Maryam Moghaddas and Babak Hamidzadeh. 1999. Batching Earliest Deadline First Scheduling. In Proceedings of the Fifth International Workshop on Object-Oriented Real-Time Dependable Systems (WORDS '99). IEEE Computer Society, USA, 29. (Year: 1999).*
(Continued)

*Primary Examiner* — Catherine Thiaw
*Assistant Examiner* — Amir Mahdi Hajiabbasi
(74) *Attorney, Agent, or Firm* — Yee & Associates, P.C.

(57) ABSTRACT

Managing cloud workloads is provided. It is determined whether a set of software vulnerabilities exists in an in-use software package corresponding to a cloud workload based on a search of a set of software vulnerability databases. In response to determining that a set of software vulnerabilities exists in an in-use software package corresponding to the cloud workload based on the search, a set of target software update times to apply a set of software updates corresponding to the set of software vulnerabilities in the in-use software package is determined based on customer preference settings and compliance objectives to at least one of minimize disruption and maximize security of the cloud workload. The set of software updates is applied to the in-use software package of the cloud workload to mitigate the set of software vulnerabilities in the in-use software package in accordance with the set of target software update times.

11 Claims, 6 Drawing Sheets

(51) Int. Cl.

| | |
|---|---|
| ***G06F 8/65*** | (2018.01) |
| ***G06F 21/54*** | (2013.01) |
| ***H04N 21/262*** | (2011.01) |

(56) References Cited

U.S. PATENT DOCUMENTS

| | | | | |
|---|---|---|---|---|
| 9,483,247 | B2 * | 11/2016 | Mandava | G06F 9/48 |
| 9,760,362 | B2 * | 9/2017 | Anderson | G06F 8/65 |
| 10,075,429 | B2 | 9/2018 | Jayanti Venkata et al. | |
| 10,235,527 | B1 * | 3/2019 | Dalessio | G06F 16/2379 |
| 10,459,750 | B2 | 10/2019 | Zhang et al. | |
| 10,735,451 | B1 * | 8/2020 | Baker | H04L 63/20 |
| 10,768,920 | B2 | 9/2020 | Fontoura et al. | |
| 11,392,365 | B2 | 7/2022 | Tsfasman et al. | |
| 11,451,589 | B2 | 9/2022 | Hoole et al. | |
| 11,556,330 | B2 | 1/2023 | Zaina et al. | |
| 2014/0337982 | A1 * | 11/2014 | Crosby | H04L 63/1433 726/25 |
| 2016/0044049 | A1 * | 2/2016 | Xing | H04L 63/14 726/23 |
| 2017/0005856 | A1 * | 1/2017 | Thomas | H04L 67/535 |
| 2019/0050257 | A1 | 2/2019 | Srinivasan | |
| 2019/0102548 | A1 * | 4/2019 | Bulut | G06F 21/568 |
| 2022/0171861 | A1 * | 6/2022 | Li | G06F 8/65 |
| 2022/0374220 | A1 | 11/2022 | Childress et al. | |
| 2023/0004652 | A1 * | 1/2023 | Gupta | G06F 21/562 |
| 2023/0222222 | A1 * | 7/2023 | Pagnozzi | G06F 8/65 726/22 |
| 2024/0370568 | A1 * | 11/2024 | Chen | G06F 21/577 |

OTHER PUBLICATIONS

SolarWinds, 'Schedule the updates by classification', https://documentation.solarwinds.com/en/success_center/patchman/content/spm-getting-started-schedule-managed-computer-updates.htm, version dated Oct. 28, 2020 (Year: 2020).*

* cited by examiner

CLOUD WORKLOAD MANAGEMENT BASED ON CONFIGURABLE COMPLIANCE OBJECTIVES

BACKGROUND

The disclosure relates generally to cloud workloads and more specifically to managing cloud workloads.

A workload, in general terms, is the amount of time and computing resources a system or network takes to complete a task or generate a particular output. Broadly speaking, workload refers to a computational task or process and the computing, storage, memory, and network resources the task requires.

In a cloud computing context, workload refers to any service, application, or capability that consumes cloud-based resources. In this cloud computing context, databases, applications, microservices, containers, virtual machines, and the like are considered workloads.

Workloads can range from simple tasks, such as running a single application or computation, to complex operations, such as processing large-scale data analytics or running a suite of interconnected applications. Managing workloads is an aspect of resource optimization, directly impacting system performance.

SUMMARY

According to one illustrative embodiment, a method is provided. It is determined whether a set of software vulnerabilities exists in an in-use software package of a set of in-use software packages corresponding to a cloud workload in a production environment based on a search of a set of software vulnerability databases. In response to determining that a set of software vulnerabilities exists in an in-use software package of the set of in-use software packages corresponding to the cloud workload in the production environment based on the search, a set of target software update times to apply a set of software updates corresponding to the set of software vulnerabilities in the in-use software package of the cloud workload is determined based on customer preference settings and compliance objectives to at least one of minimize disruption and maximize security of the cloud workload. The set of software updates is applied to the in-use software package of the cloud workload in the production environment to mitigate the set of software vulnerabilities in the in-use software package in accordance with the set of target software update times determined for the set of software updates based on the customer preference settings and the compliance objectives to at least one of minimize the disruption and maximize the security of the cloud workload. According to other illustrative embodiments, a computer system and computer program product are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
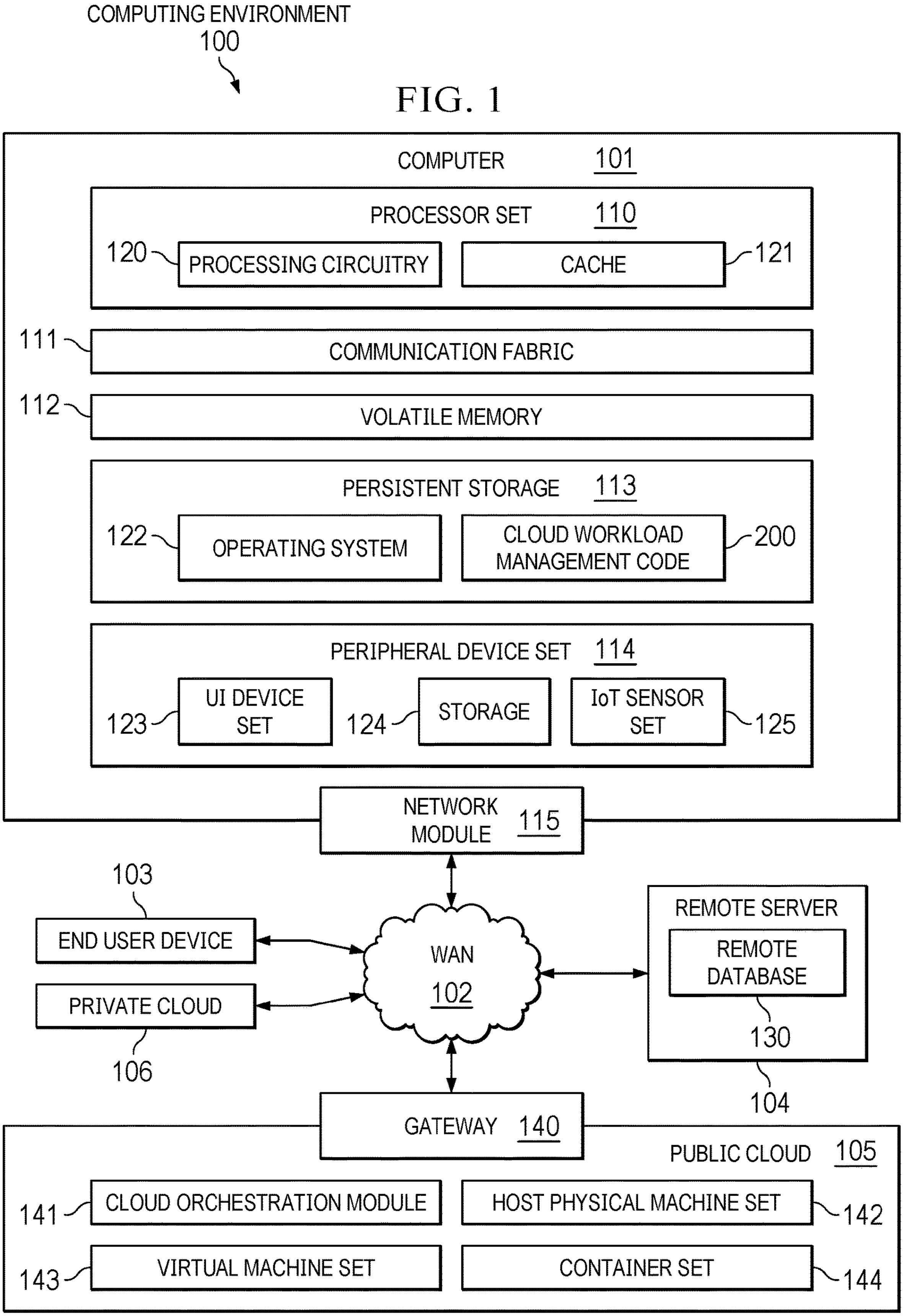
FIG. 1 is a pictorial representation of a computing environment in which illustrative embodiments may be implemented.

With reference now to the figures, and in particular, with reference to FIG. 1, a diagram of a data processing environment is provided in which illustrative embodiments may be implemented. It should be appreciated that FIG. 1 is only meant as an example and is not intended to assert or imply any limitation with regard to the environments in which different embodiments may be implemented. Many modifications to the depicted environment may be made.

FIG. 1 shows a pictorial representation of a computing environment in which illustrative embodiments may be implemented. Computing environment 100 contains an example of a cloud environment for the execution of at least some of the computer code involved in performing the inventive methods of illustrative embodiments, such as cloud workload management code 200. For example, cloud workload management code 200 minimizes disruptions and maximizes security of cloud workloads in production environments while performing software updates of software packages corresponding to the cloud workloads to mitigate identified software vulnerabilities in the software packages in accordance with customer preference settings and compliance objectives.

In addition to cloud workload management code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and cloud workload management code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 is located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in cloud workload management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a system administrator who utilizes the cloud workload management service provided by computer 101), and may take any of the forms discussed above in connection with computer 101. EUD 103 typically receives helpful and useful data from the operations of computer 101. For example, in a hypothetical case where computer 101 is designed to provide a cloud workload software update recommendation to the end user, this recommendation would typically be communicated from network module 115 of computer 101 through WAN 102 to EUD 103. In this way, EUD 103 can display, or otherwise present, the cloud workload software update recommendation to the end user. In some embodiments, EUD 103 may be a client device, such as a thin client, heavy client, mainframe computer, desktop computer, laptop computer, tablet computer, smart phone, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a cloud workload software update recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Production environments, such as, for example, cloud databases and the like, have compliance accreditations, such as, for example, Systems and Organization Controls 2, Payment Card Industry, Federal Information Processing Standards, and the like. Systems and Organization Controls 2 is a security framework that specifies how entities (e.g., enterprises, businesses, companies, organizations, institutions, agencies, and the like) should protect user data from unauthorized access, security incidents, and other vulnerabilities. The Payment Card Industry mandates credit card company compliance to ensure the security of credit card transactions in the payments industry. Federal Information Processing Standards are standards for federal computer systems developed by the National Institute of Standards and Technology. In addition, production environment components, such as, for example, container images, worker versions, and the like, have various regulatory compliance timelines for software updates to mitigate software vulnerabilities.

As a result, production environments need to maintain multiple regulatory compliance controls. However, each of these regulatory compliance controls may belong to different regulatory agencies that may have different and sometimes conflicting compliance requirements. For example, one regulatory agency may require that a software update for a particular software vulnerability be installed within 2 days to mitigate that particular vulnerability, whereas another regulatory agency may require that the software update to be installed within 2 weeks to mitigate that particular vulnerability.

Thus, current solutions need to determine how to maintain compliance controls in production environments based on multiple software update deadlines that are constantly at play. Furthermore, a common complaint from customers is the cloud workload disruption experienced when current solutions perform software updates corresponding to cloud workloads of these customers. However, in order to remediate software vulnerabilities and maintain regulatory compliance, software, such as container images, corresponding to these cloud workloads should be regularly updated to newer versions. In a stateful production environment (e.g., cloud databases), software updates often require some sort of switchover that results in cloud workload disruption for customers. This cloud workload disruption is inherently part of cloud environments. Typically, cloud workload disruptions last no more than 15-30 seconds. However, this relatively short cloud workload disruption period is still detected via monitoring and is an issue for customers in an always-on world where databases in production environments (e.g., bank transactions, ATM transactions, financial transactions, and the like) are central to business processes.

Current solutions generally perform software updates on release cycles (e.g., every 2-3 weeks), which result in production environments receiving new software updates all at the same time. However, it would be useful to provide customers control over recurring cloud workload disruptions. This customer control over recurring cloud workload disruptions can come in various forms, such as determining customer-specified maintenance window preferences or specific regulatory compliance controls, to prioritize software updates to remediate identified software vulnerabilities corresponding to a particular cloud workload.

Illustrative embodiments take into account the customer's preferences for recommending regulatory compliance settings, providing a summary of expectations for current regulatory compliance settings, and opting in to some self-adjusting regulatory compliance settings based on a particular customer's cloud workload or common cloud workloads. It should be noted that illustrative embodiments are applicable to production environments and not to development environments because development environments have different compliance regulations and management.

Illustrative embodiments take into account special considerations when interacting with production environments so that customer cloud workload disruption or data loss can be avoided or minimized as much as possible. In order to minimize the risk of software vulnerabilities and take advantage of software updates having, for example, new features, performance improvements, or the like, cloud workloads should be updated to the latest software version as often as software updates are released. However, these software updates are disruptive to customer workloads as these software updates generally involve some level of service disruption or unavailability during the software update process, even if these software updates are performed during off-hours maintenance windows.

It should be noted that different customers weigh software update priorities differently based on, for example, workload disruption and use case security. For example, one customer may desire software updates to occur as frequently as possible to maximize security, while another customer may prefer to minimize workload disruption by delaying software updates until a customer-configured maintenance window is reached. Additionally, security policies and regulatory compliance form a strict constraint space that limits vulnerability remediation timelines. Illustrative embodiments enable customers to fine-tune their preferences based on regulatory compliance considerations.

For example, illustrative embodiments group or divide all software updates into software update categories based on customer preference settings and software vulnerability severity classes in accordance with industry practices. For example, the set of software update categories may include a customer preference category, software vulnerability category, and the like. The customer preference category may include software updates corresponding to feature changes, performance enhancements, and the like. The software vulnerability category may include software updates corresponding to low-severity vulnerabilities, medium-severity vulnerabilities, high-severity vulnerabilities, critical-severity vulnerabilities, and the like. The software vulnerability severity classes (e.g., low, medium, high, and critical) follow standard industry practices.

Illustrative embodiments allow a cloud customer to define regulatory and security compliance objectives for each respective cloud workload corresponding to that particular cloud customer. For example, the customer can either select to apply a particular software update immediately to maximize security, or select a maximum time just before that particular software update should be applied to remediate a particular software vulnerability for regulatory compliance to minimize workload disruption. It should be noted that selection of the maximum time is constrained by compliance objectives (e.g., the customer cannot select a software update time that will violate a regulatory compliance requirement or a defined cloud security policy).

In addition, a customer can configure recurring maintenance windows for software updates. Furthermore, the customer can select whether or not to follow a recurring maintenance window when applying a software update corresponding to a particular software update category.

Illustrative embodiments track all of the software packages that are in use by a particular cloud workload, and the version of each software package used. The software packages may include, for example, container images, operating systems, hypervisors, and the like that correspond to a particular cloud workload of a customer. When illustrative embodiments identify a vulnerability corresponding to a particular software package (e.g., via a Common Vulnerabilities and Exposures (CVE) disclosure process), illustrative embodiments track the identified vulnerability along with the cloud workload affected by that vulnerability. CVE provides a list of publicly disclosed computer security software flaws (i.e., vulnerabilities and exposures) in publicly released software packages.

Based on the compliance objectives defined by a customer for a particular cloud workload and identification of one or more software vulnerabilities that affect that particular cloud workload, illustrative embodiments determine a target software update time to remediate the one or more software vulnerabilities affecting that particular cloud workload. Illustrative embodiments set the target software update time to occur just before the earliest software update deadline is reached for all of the software vulnerabilities affecting that particular cloud workload to minimize cloud workload disruption for the customer.

If a software vulnerability corresponds to a software update category that the customer wants to remediate immediately, then illustrative embodiments set the target software update time to "now" to maximize security for the customer. If the customer has configured a recurring maintenance window (e.g., every Saturday and Sunday), then illustrative embodiments set the target software update time for remediation of the software vulnerability to occur during the first recurring maintenance window preceding the software update deadline corresponding to that particular software vulnerability.

If illustrative embodiments determine that the target software update time for remediation of a particular software vulnerability has passed, then illustrative embodiments perform the software update immediately. Otherwise, if the target software update time for remediation of a particular software vulnerability has not passed, then illustrative embodiments present the target software update time for remediation of that particular software vulnerability to the customer for review. Illustrative embodiments present the target software update time for remediation of that particular software vulnerability to the customer in a user interface that also includes a description of the software vulnerability and an option for the customer to manually trigger the software update corresponding to that particular software vulnerability if desired. It should be noted that illustrative embodiments continuously recalculate target software update times as illustrative embodiments identify software vulnerabilities corresponding to cloud workloads.

Thus, illustrative embodiments provide one or more technical solutions that overcome a technical problem with an inability of current solutions to minimize disruptions and maximize security of cloud workloads in production environments while performing software updates of software packages corresponding to the cloud workloads to mitigate identified software vulnerabilities in the software packages in accordance with customer preference settings and compliance objectives. As a result, these one or more technical solutions provide a technical effect and practical application in the field of cloud workload management and performance.

Figure 2:
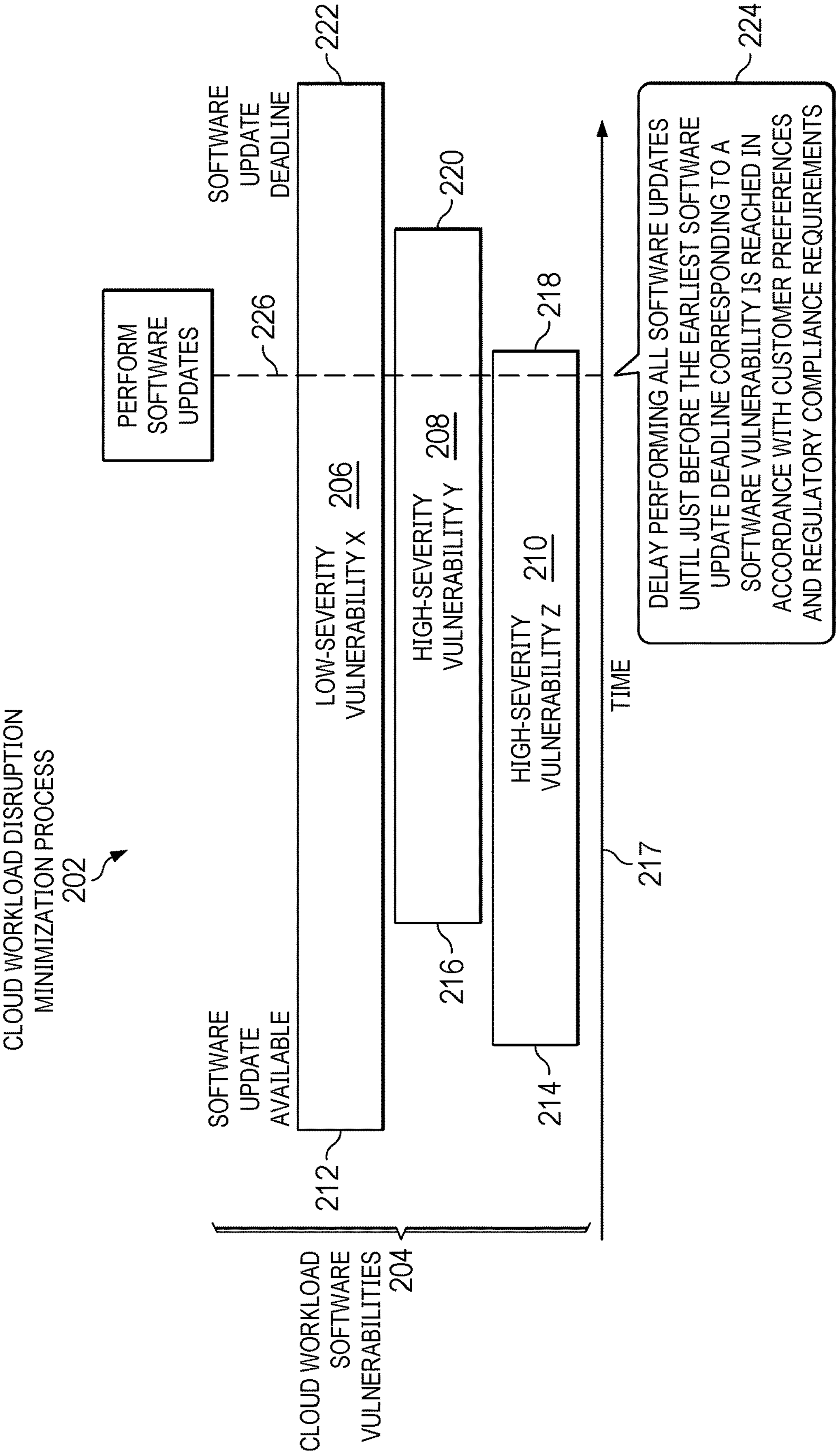
FIG. 2 is a diagram illustrating an example of a cloud workload disruption minimization process in accordance with an illustrative embodiment.

With reference now to FIG. 2, a diagram illustrating an example of a cloud workload disruption minimization process is depicted in accordance with an illustrative embodiment. Cloud workload disruption minimization process 202 may be implemented in a computer, such as computer 101 in FIG. 1. For example, cloud workload disruption minimization process 202 may be implemented by cloud workload management code 200 in FIG. 1. Cloud workload disruption minimization process 202 minimizes the disruption of a cloud workload running in a production environment during software updates of software packages corresponding to the cloud workload to mitigate identified software vulnerabilities in the software packages.

In this example, cloud workload disruption minimization process 202 identifies cloud workload software vulnerabilities 204 corresponding to one or more software packages of the cloud workload based on a search of a set of software vulnerabilities databases. In this example, cloud workload software vulnerabilities 204 comprise low-severity vulnerability X 206, high-severity vulnerability Y 208, and high-severity vulnerability Z 210, which correspond to the one or more software packages of the cloud workload. However, it should be noted that cloud workload software vulnerabilities

204 are intended as examples only and not as limitations on illustrative embodiments. For example, cloud workload software vulnerabilities 204 may comprise any number and type of software vulnerabilities. In addition, cloud workload software vulnerabilities 204 may correspond to more than one cloud workload or common cloud workloads.

In this example, cloud workload disruption minimization process 202 detects that a software update is available for low-severity vulnerability X 206 at 212, a software update is available for high-severity vulnerability Z 210 at 214, and a software update is available for high-severity vulnerability Y 208 at 216 with regard to timeline 217. Further, cloud workload disruption minimization process 202 determines that a software update deadline is set for high-severity vulnerability Z 210 at 218, a software update deadline is set for high-severity vulnerability Y 208 at 220, and a software update deadline is set for low-severity vulnerability X 206 at 222 based on customer preference settings and regulatory compliance regulations.

At 224, cloud workload disruption minimization process 202 delays performing all software updates until just before the earliest software update deadline corresponding to a software vulnerability is reached in accordance with the customer preference settings and regulatory compliance requirements. As a result, cloud workload disruption minimization process 202 performs all the software updates to mitigate low-severity vulnerability X 206, high-severity vulnerability Y 208, and high-severity vulnerability Z 210 at 226 just before software update deadline 218 for high-severity vulnerability Z 210 is reached to minimize the disruption to the cloud workload.

Figure 3:
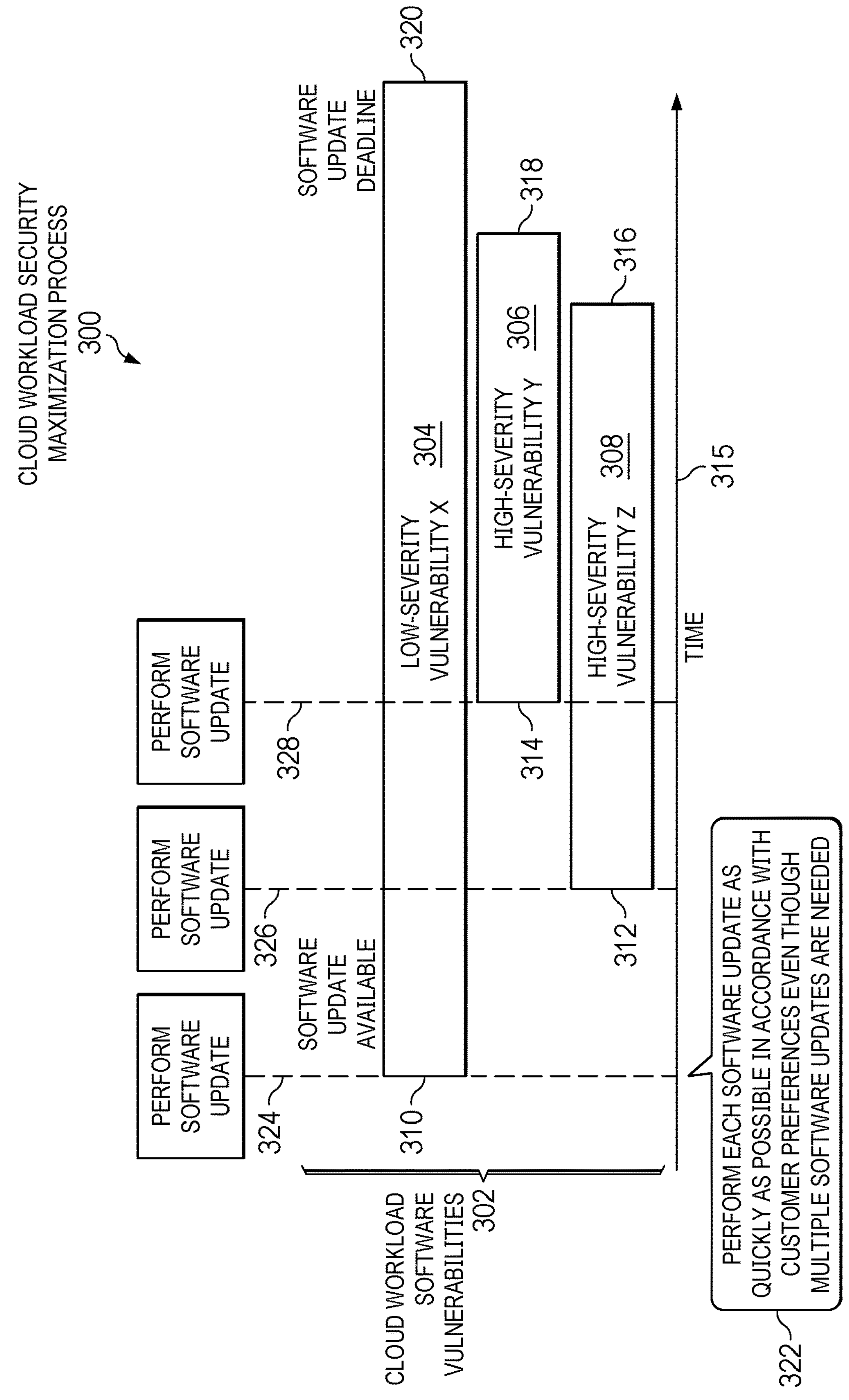
FIG. 3 is a diagram illustrating an example of a cloud workload security maximization process in accordance with an illustrative embodiment.

With reference now to FIG. 3, a diagram illustrating an example of a cloud workload security maximization process is depicted in accordance with an illustrative embodiment. Cloud workload security maximization process 300 may be implemented in a computer, such as computer 101 in FIG. 1. For example, cloud workload security maximization process 300 may be implemented by cloud workload management code 200 in FIG. 1. Cloud workload security maximization process 300 maximizes the security of a cloud workload running in a production environment during software updates of software packages corresponding to the cloud workload.

In this example, cloud workload security maximization process 300 identifies cloud workload software vulnerabilities 302 corresponding to one or more software packages of the cloud workload based on a search of a set of software vulnerabilities databases. In this example, cloud workload software vulnerabilities 302 comprise low-severity vulnerability X 304, high-severity vulnerability Y 306, and high-severity vulnerability Z 308, which correspond to the one or more software packages of the cloud workload.

In this example, cloud workload security maximization process 300 detects that a software update is available for low-severity vulnerability X 304 at 310, a software update is available for high-severity vulnerability Z 308 at 312, and a software update is available for high-severity vulnerability Y 306 at 314 with regard to timeline 315. Further, cloud workload security maximization process 300 determines that a software update deadline is set for high-severity vulnerability Z 308 at 316, a software update deadline is set for high-severity vulnerability Y 306 at 318, and a software update deadline is set for low-severity vulnerability X 304 at 320 based on customer preference settings and regulatory compliance regulations.

At 322, cloud workload security maximization process 300 determines to perform each software update as quickly as possible in accordance with the customer preference settings even though multiple software updates are needed for the cloud workload. As a result, cloud workload security maximization process 300 performs the software update to mitigate low-severity vulnerability X 304 at 324 as soon as the software update is available at 310, performs the software update to mitigate high-severity vulnerability Z 308 at 326 as soon as the software update is available at 312, and performs the software update to mitigate high-severity vulnerability Y 306 at 328 as soon as the software update is available at 314 to maximize the security of the cloud workload.

Figure 4:
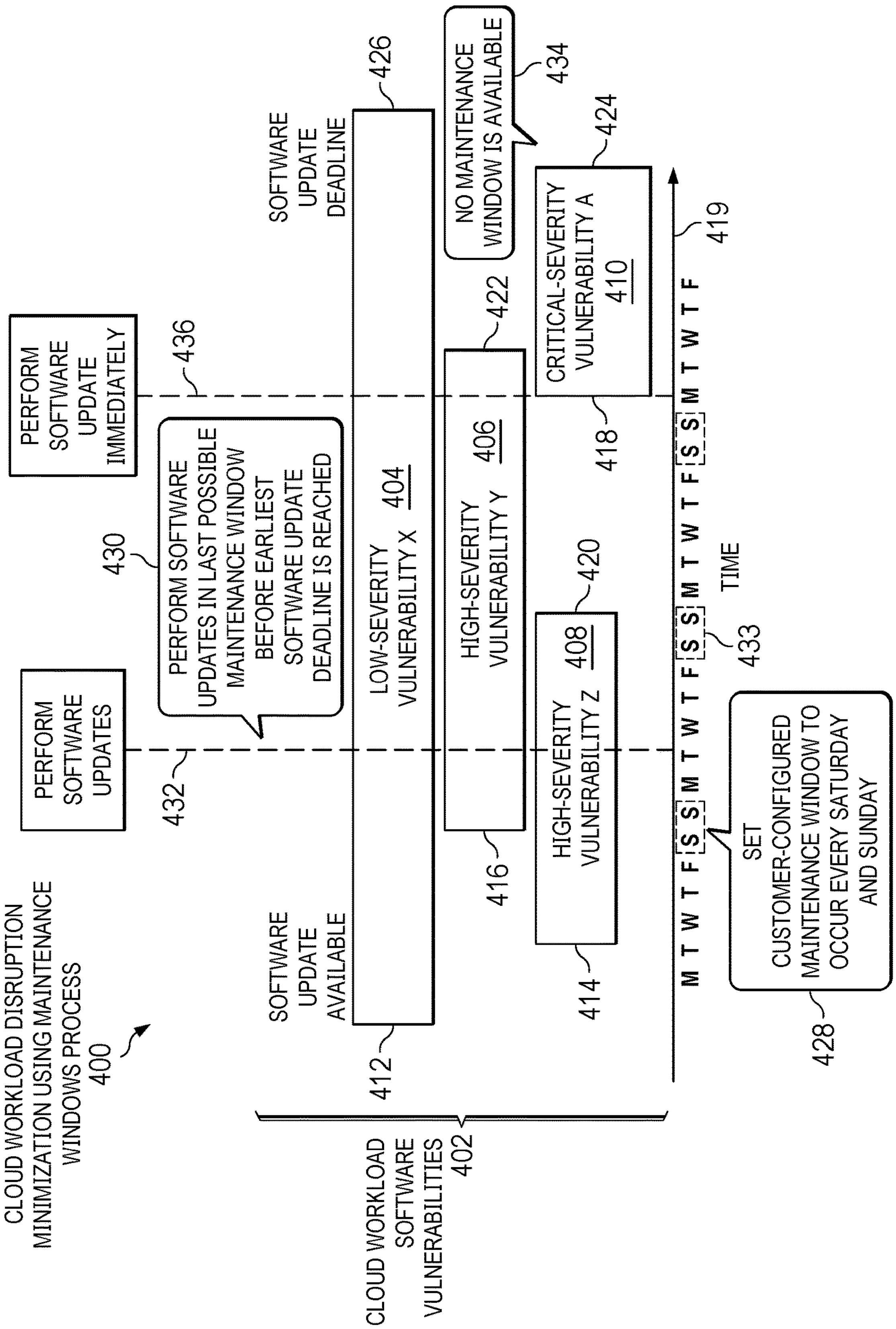
FIG. 4 is a diagram illustrating an example of a cloud workload disruption minimization using maintenance windows process in accordance with an illustrative embodiment.

With reference now to FIG. 4, a diagram illustrating an example of a cloud workload disruption minimization using maintenance windows process is depicted in accordance with an illustrative embodiment. Cloud workload disruption minimization using maintenance windows process 400 may be implemented in a computer, such as computer 101 in FIG. 1. For example, cloud workload disruption minimization using maintenance windows process 400 may be implemented by cloud workload management code 200 in FIG. 1. Cloud workload disruption minimization using maintenance windows process 400 minimizes the disruption of a cloud workload running in a production environment using customer-configured maintenance windows to perform software updates of software packages corresponding to the cloud workload to mitigate identified software vulnerabilities in the software packages.

In this example, cloud workload disruption minimization using maintenance windows process 400 identifies cloud workload software vulnerabilities 402 corresponding to one or more software packages of the cloud workload based on a search of a set of software vulnerabilities databases. In this example, cloud workload software vulnerabilities 402 comprise low-severity vulnerability X 404, high-severity vulnerability Y 406, high-severity vulnerability Z 408, and critical-severity vulnerability A 410, which correspond to the one or more software packages of the cloud workload.

In this example, cloud workload disruption minimization using maintenance windows process 400 detects that a software update is available for low-severity vulnerability X 404 at 412, a software update is available for high-severity vulnerability Z 408 at 414, a software update is available for high-severity vulnerability Y 406 at 416, and a software update is available for critical-severity vulnerability A 410 at 418 with regard to timeline 419. Further, cloud workload disruption minimization using maintenance windows process 400 determines that a software update deadline is set for high-severity vulnerability Z 408 at 420, a software update deadline is set for high-severity vulnerability Y 406 at 422, a software update deadline is set for critical-severity vulnerability A 410 at 424, and a software update deadline is set for low-severity vulnerability X 404 at 426 based on customer preference settings and regulatory compliance regulations.

At 428, cloud workload disruption minimization using maintenance windows process 400 sets a customer-configured maintenance window to occur every Saturday and Sunday on timeline 419. In addition, at 430, cloud workload disruption minimization using maintenance windows process 400 determines to perform software updates in a last possible maintenance window before the earliest software update deadline corresponding to a software vulnerability is reached in accordance with the customer preference settings and regulatory compliance requirements. As a result, cloud workload disruption minimization using maintenance windows process 400 performs software updates to mitigate low-severity vulnerability X 404, high-severity vulnerability Y 406, and high-severity vulnerability Z 408 at 432 during maintenance window 433 before software update deadline 420 for high-severity vulnerability Z 408 is reached to minimize the disruption to the cloud workload.

In addition, at 434, cloud workload disruption minimization using maintenance windows process 400 determines that no maintenance window is available for a software update to mitigate critical-severity vulnerability A 410. As a result, cloud workload disruption minimization using maintenance windows process 400 immediately performs the software update to mitigate critical-severity vulnerability A 410 at 436 as soon as the software update is available at 418 to maximize security of the cloud workload.

Figure 5A:
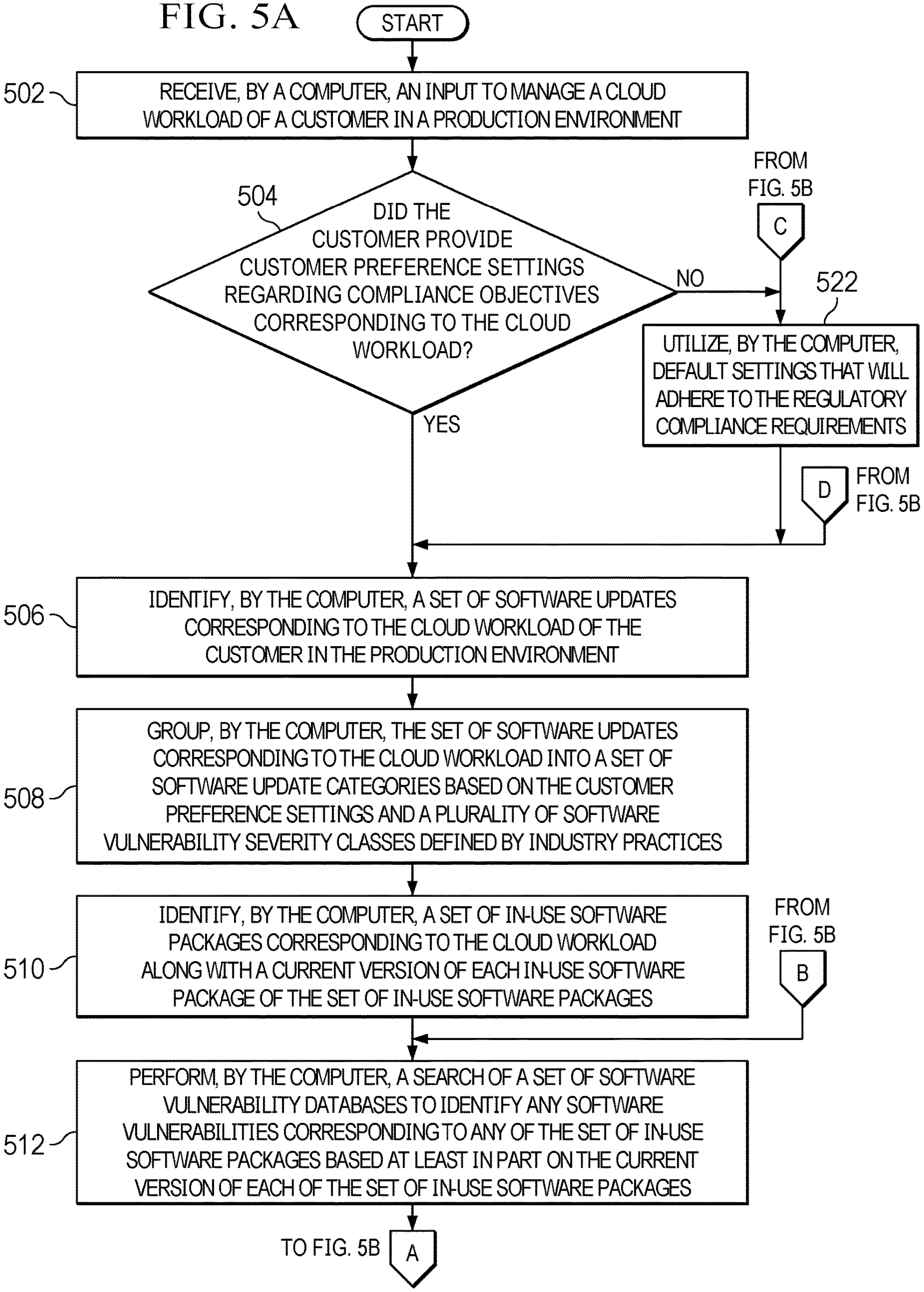
FIGS. 5A-5B are a flowchart illustrating a process for cloud workload management in accordance with an illustrative embodiment.
Figure 5B:
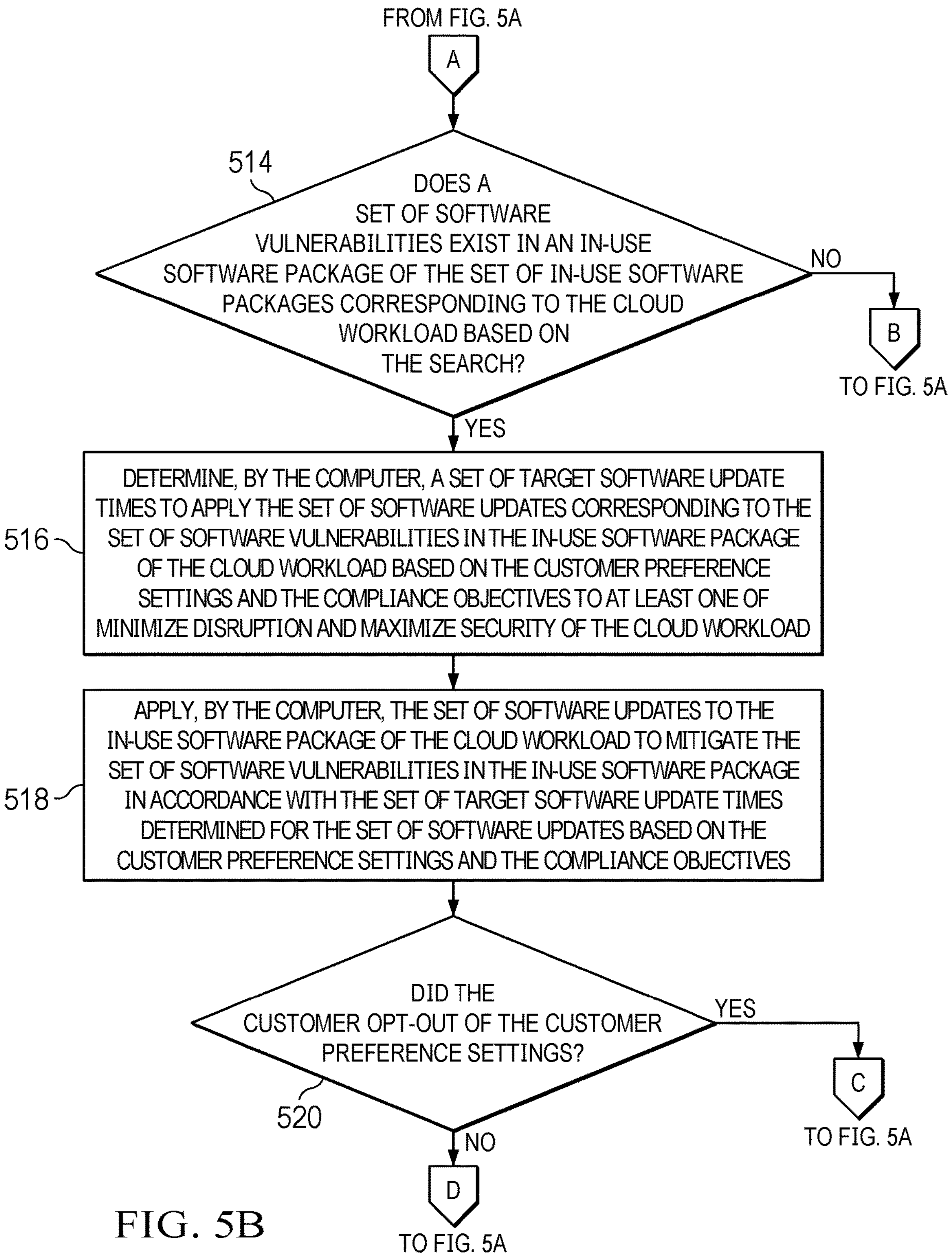

With reference now to FIGS. 5A-5B, a flowchart illustrating a process for cloud workload management is shown in accordance with an illustrative embodiment. The process shown in FIGS. 5A-5B may be implemented in a computer, such as, for example, computer 101 in FIG. 1. For example, the process shown in FIGS. 5A-5B may be implemented by cloud workload management code 200 in FIG. 1.

The process begins when the computer receives an input to manage a cloud workload of a customer in a production environment (step 502). In addition, the computer makes a determination as to whether the customer provided customer preference settings regarding compliance objectives corresponding to the cloud workload of the customer in the production environment (step 504). The compliance objectives include regulatory compliance requirements for software vulnerability mitigation.

If the computer determines that the customer did not provide any customer preference settings regarding the compliance objectives corresponding to the cloud workload of the customer in the production environment, no output of step 504, then the process proceeds to step 522. If the computer determines that the customer did provide the customer preference settings regarding the compliance objectives corresponding to the cloud workload of the customer in the production environment, yes output of step 504, then the computer identifies a set of software updates corresponding to the cloud workload of the customer in the production environment (step 506). Further, the computer groups the set of software updates corresponding to the cloud workload into a set of software update categories based on the customer preference settings and a plurality of software vulnerability severity classes defined by industry practices (step 508). Furthermore, the computer identifies a set of in-use software packages corresponding to the cloud workload along with a current version of each in-use software package of the set of in-use software packages (step 510). Moreover, the computer performs a search of a set of software vulnerability databases to identify any software vulnerabilities corresponding to any of the set of in-use software packages based at least in part on the current version of each of the set of in-use software packages (step 512).

The computer makes a determination as to whether a set of software vulnerabilities exists in an in-use software package of the set of in-use software packages corresponding to the cloud workload based on the search (step 514). If the computer determines that no software vulnerabilities exist in any of the set of in-use software packages corresponding to the cloud workload based on the search, no output of step 514, then the process returns to step 512 where the computer continues to search the set of software vulnerability databases. If the computer determines that a set of software vulnerabilities does exist in an in-use software package of the set of in-use software packages corresponding to the cloud workload based on the search, yes output of step 514, then the computer determines a set of target software update times to apply the set of software updates corresponding to the set of software vulnerabilities in the in-use software package of the cloud workload based on the customer preference settings and the compliance objectives to at least one of minimize disruption and maximize security of the cloud workload (step 516). Subsequently, the computer applies the set of software updates to the in-use software package of the cloud workload to mitigate the set of software vulnerabilities in the in-use software package in accordance with the set of target software update times determined for the set of software updates based on the customer preference settings and the compliance objectives to at least one of minimize the disruption and maximize the security of the cloud workload (step 518).

In one illustrative embodiment, the computer can delay applying the set of software updates to the in-use software package of the cloud workload in the production environment to mitigate the set of software vulnerabilities in the in-use software package until just before an earliest software update deadline corresponding to the set of software vulnerabilities is reached in accordance with the customer preference settings and the compliance objectives to minimize the disruption to the cloud workload. In an alternative illustrative embodiment, the computer can apply each software update of the set of software updates to the in-use software package of the cloud workload in the production environment as each of the set of software updates becomes available in accordance with the customer preference settings to maximize the security of the cloud workload. In another alternative illustrative embodiment, the computer can apply the set of software updates to the in-use software package of the cloud workload in the production environment to mitigate the set of software vulnerabilities in the in-use software package in a last possible maintenance window before an earliest software update deadline corresponding to the set of software vulnerabilities is reached in accordance with the customer preference settings and the compliance objectives to minimize the disruption to the cloud workload.

Afterward, the computer makes a determination as to whether the customer opted out of the customer preference settings (step 520). If the computer determines that the customer did not opt-out of the customer preference settings, no output of step 520, then the process returns to step 506 where the computer waits to identify another set of software updates corresponding to the cloud workload of the customer. If the computer determines that the customer did opt-out of the customer preference settings, yes output of step 520, then the computer utilizes default settings that will adhere to the regulatory compliance requirements (step 522). Thereafter, the process returns to step 506 where the computer waits to identify software updates corresponding to the cloud workload of the customer.

Thus, illustrative embodiments of the present disclosure provide a computer-implemented method, computer system, and computer program product for minimizes the disruption and maximizing the security of a cloud workload running in a production environment during software updates of software packages corresponding to the cloud workload to mitigate identified software vulnerabilities in the software packages. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

determining whether a plurality of software vulnerabilities having a plurality of different software vulnerability severities exists in a plurality of in-use software packages corresponding to a cloud workload in a production environment based on a search of a set of software vulnerability databases;

responsive to determining that the plurality of software vulnerabilities having the plurality of different software vulnerability severities exists in the plurality of in-use software packages corresponding to the cloud workload in the production environment based on the search, determining a plurality of different target software update deadlines to apply a plurality of different software updates corresponding to the plurality of software vulnerabilities having the plurality of different software vulnerability severities in the plurality of in-use software packages of the cloud workload based on customer preference settings and compliance objectives to minimize disruption of the cloud workload; and applying all of the plurality of different software updates at a same time to the plurality of in-use software packages of the cloud workload in the production environment to mitigate the plurality of software vulnerabilities having the plurality of different software vulnerability severities in the plurality of in-use software packages, wherein the applying of all of the plurality of different software updates at a same time to the plurality of in-use software packages is delayed until just before an earliest target software update deadline in the plurality of different target software update deadlines corresponding to each of the plurality of software vulnerabilities is reached in accordance with the customer preference settings and the compliance objectives to minimize the disruption of the cloud workload.

2. The method of claim 1, further comprising:

receiving an input to manage the cloud workload of a customer in the production environment; and determining whether the customer provided the customer preference settings regarding the compliance objectives corresponding to the cloud workload, the compliance objectives include regulatory compliance requirements for software vulnerability mitigation.

3. The method of claim 2, further comprising:

responsive to determining that the customer did provide the customer preference settings regarding the compliance objectives corresponding to the cloud workload, identifying the set of software updates corresponding to the cloud workload of the customer in the production environment; and grouping the plurality of different software updates corresponding to the cloud workload into a set of software update categories based on the customer preference settings and a plurality of software vulnerability severity classes defined by industry practices.

4. The method of claim 1, further comprising:

identifying the plurality of in-use software packages corresponding to the cloud workload along with a current version of each in-use software package of the plurality of in-use software packages; and performing the search of the set of software vulnerability databases to identify any software vulnerabilities corresponding to any of the plurality of in-use software packages based at least in part on the current version of each of the plurality of in-use software packages.

5. A computer system comprising:

a processor set;

one or more computer-readable storage media; and program instructions stored on the one or more computer-readable storage media to cause the processor set to perform operations comprising:

determining whether a plurality of software vulnerabilities having a plurality of different software vulnerability severities exists in a plurality of in-use software packages corresponding to a cloud workload in a production environment based on a search of a set of software vulnerability databases;

responsive to determining that the plurality of software vulnerabilities having the plurality of different software vulnerability severities exists in the plurality of in-use software packages corresponding to the cloud workload in the production environment based on the search, determining a plurality of different target software update deadlines to apply a plurality of different software updates corresponding to the plurality of software vulnerabilities having the plurality of different software vulnerability severities in the plurality of in-use software packages of the cloud workload based on customer preference settings and compliance objectives to minimize disruption of the cloud workload; and applying all of the plurality of different software updates at a same time to the plurality of in-use software packages of the cloud workload in the production environment to mitigate the plurality of software vulnerabilities having the plurality of different software vulnerability severities in the plurality of in-use software packages, wherein the applying of all of the plurality of different software updates at a same time to the plurality of in-use software packages is delayed until just before an earliest target software update deadline in the plurality of different target software update deadlines corresponding to each of the plurality of software vulnerabilities is reached in accordance with the customer preference settings and the compliance objectives to minimize the disruption of the cloud workload.

6. The computer system of claim 5, wherein the operations further comprise:

receiving an input to manage the cloud workload of a customer in the production environment; and determining whether the customer provided the customer preference settings regarding the compliance objectives corresponding to the cloud workload, the compliance objectives include regulatory compliance requirements for software vulnerability mitigation.

7. The computer system of claim 6, wherein the operations further comprise:

responsive to determining that the customer did provide the customer preference settings regarding the compliance objectives corresponding to the cloud workload, identifying the set of software updates corresponding to the cloud workload of the customer in the production environment; and grouping the plurality of different software updates corresponding to the cloud workload into a set of software update categories based on the customer preference settings and a plurality of software vulnerability severity classes defined by industry practices.

8. A computer program product comprising:

one or more computer-readable storage media; and program instructions stored on the one or more computer-readable storage media to perform operations comprising:

determining whether a plurality of software vulnerabilities having a plurality of different software vulnerability severities exists in a plurality of in-use software packages corresponding to a cloud workload in a production environment based on a search of a set of software vulnerability databases;

responsive to determining that the plurality of software vulnerabilities having the plurality of different software vulnerability severities exists in the plurality of in-use software packages corresponding to the cloud workload in the production environment based on the search, determining a plurality of different target software update deadlines to apply a plurality of different software updates corresponding to the plurality of software vulnerabilities having the plurality of different software vulnerability severities in the plurality of in-use software packages of the cloud workload based on customer preference settings and compliance objectives to minimize disruption of the cloud workload; and applying all of the plurality of different software updates at a same time to the plurality of in-use software packages of the cloud workload in the production environment to mitigate the plurality of software vulnerabilities having the plurality of different software vulnerability severities in the plurality of in-use software packages, wherein the applying of all of the plurality of different software updates at a same time to the plurality of in-use software packages is delayed until just before an earliest target software update deadline in accordance with the set the plurality of different target software update deadlines corresponding to each of the plurality of software vulnerabilities is reached in accordance with the customer preference settings and the compliance objectives to minimize the disruption of the cloud workload.

9. The computer program product of claim 8, wherein the operations further comprise:

receiving an input to manage the cloud workload of a customer in the production environment; and determining whether the customer provided the customer preference settings regarding the compliance objectives corresponding to the cloud workload, the compliance objectives include regulatory compliance requirements for software vulnerability mitigation.

10. The computer program product of claim 9, wherein the operations further comprise:

responsive to determining that the customer did provide the customer preference settings regarding the compliance objectives corresponding to the cloud workload, identifying the set of software updates corresponding to the cloud workload of the customer in the production environment; and grouping the plurality of different software updates corresponding to the cloud workload into a set of software update categories based on the customer preference settings and a plurality of software vulnerability severity classes defined by industry practices.

11. The computer program product of claim 8, wherein the operations further comprise:

identifying the plurality of in-use software packages corresponding to the cloud workload along with a current version of each in-use software package of the plurality of in-use software packages; and performing the search of the set of software vulnerability databases to identify any software vulnerabilities corresponding to any of the plurality of in-use software packages based at least in part on the current version of each of the plurality of in-use software packages.

* * * * *